United States Patent
Nakagawa et al.

(10) Patent No.: US 10,807,191 B2
(45) Date of Patent: Oct. 20, 2020

(54) LASER WELDING METHOD, LASER WELDING CONDITIONS DETERMINING METHOD, AND LASER WELDING SYSTEM

(71) Applicant: Panasonic Intellectual Property Management Co., Ltd., Osaka (JP)

(72) Inventors: Tatsuyuki Nakagawa, Osaka (JP); Yasushi Mukai, Wilmington, MA (US); Atsuhiro Kawamoto, Hyogo (JP); Junji Fujiwara, Osaka (JP); Noriyuki Matsuoka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 355 days.

(21) Appl. No.: 15/564,207

(22) PCT Filed: May 18, 2016

(86) PCT No.: PCT/JP2016/002423
§ 371 (c)(1),
(2) Date: Oct. 4, 2017

(87) PCT Pub. No.: WO2016/194322
PCT Pub. Date: Dec. 8, 2016

(65) Prior Publication Data
US 2018/0126491 A1 May 10, 2018

(30) Foreign Application Priority Data

Jun. 1, 2015 (JP) .................................. 2015-111047

(51) Int. Cl.
*B23K 26/08* (2014.01)
*B23K 26/082* (2014.01)
(Continued)

(52) U.S. Cl.
CPC ........ *B23K 26/082* (2015.10); *B23K 26/0626* (2013.01); *B23K 26/0643* (2013.01);
(Continued)

(58) Field of Classification Search
CPC .. B23K 26/082; B23K 26/244; B23K 26/354; B23K 26/0626; B23K 26/0643;
(Continued)

(56) References Cited

U.S. PATENT DOCUMENTS

| 2007/0084835 | A1 | 4/2007 | Dinauer et al. |
| 2013/0001209 | A1* | 1/2013 | Hirota ................... B23K 9/0953 219/130.01 |
| 2016/0207142 | A1 | 7/2016 | Kawamoto et al. |

FOREIGN PATENT DOCUMENTS

| JP | 2690466 B | 12/1997 |
| JP | 10-058170 | 3/1998 |

(Continued)

OTHER PUBLICATIONS

Machine Translation: Chigiri JP 10-071480, performed Dec. 3, 2019 (Year: 1998).*
(Continued)

*Primary Examiner* — Brian W Jennison
(74) *Attorney, Agent, or Firm* — Wenderoth, Lind & Ponack, L.L.P.

(57) ABSTRACT

A welding target is irradiated with a laser beam so as to form a beam spot that moves relatively with respect to the welding target along a locus having a spiral shape rotating around a rotation center moving in a welding direction. The welding target is welded using the laser beam irradiated with. While the welding target is irradiated with the laser beam, the welding target is irradiated with the laser beam based on an
(Continued)

interval coefficient which is a value indicating an overlapping degree of the locus having the spiral shape in the welding direction.

14 Claims, 8 Drawing Sheets

(51) Int. Cl.
    *B23K 26/354*     (2014.01)
    *B23K 26/244*     (2014.01)
    *B23K 26/06*     (2014.01)
    *B23K 26/22*     (2006.01)
    *B23K 103/04*     (2006.01)

(52) U.S. Cl.
    CPC ............ *B23K 26/22* (2013.01); *B23K 26/244* (2015.10); *B23K 26/354* (2015.10); *B23K 26/0648* (2013.01); *B23K 26/0884* (2013.01); *B23K 2103/04* (2018.08)

(58) Field of Classification Search
    CPC .. B23K 26/0876; B23K 29/082; B23K 26/22; B23K 26/0648; B23K 26/0884; B23K 2103/04

See application file for complete search history.

(56) References Cited

FOREIGN PATENT DOCUMENTS

| | | |
|---|---|---|
| JP | 10-071480 | 3/1998 |
| JP | 2015-030018 | 2/2015 |
| WO | 2013/167240 | 11/2013 |
| WO | 2015/072107 | 5/2015 |

OTHER PUBLICATIONS

International Search Report of PCT application No. PCT/JP2016/002423 dated Aug. 9, 2016.

Extended European Search Report dated Jun. 11, 2018 in European Patent Application No. 16802765.4.

\* cited by examiner

LASER WELDING METHOD, LASER WELDING CONDITIONS DETERMINING METHOD, AND LASER WELDING SYSTEM

This application is a U.S. national stage application of the PCT international application No. PCT/JP2016/002423 filed on May 18, 2016, which claims the benefit of foreign priority of Japanese patent application No. 2015-111047 filed on Jun. 1, 2015, the contents all of which are incorporated herein by reference.

TECHNICAL FIELD

The present invention relates to a laser welding method of performing welding by irradiating a welding target with a laser beam, a laser welding conditions determining method, and a laser welding system.

BACKGROUND ART

In laser welding in which a welding target is welded by laser beam irradiation, in order to improve a positional shift or a gap margin as compared with a case of welding in a linear locus, a technique of welding by moving laser in a spiral locus, and increasing the amount of molten metal has been used.

Regarding the spiral locus welding, for example, PTL 1 discloses a technique of promoting release of gas contained in a molten portion by a stirring effect due to laser passing again through a portion welded once in aluminum material.

CITATION LIST

Patent Literature

PTL 1: Japanese Patent No. 2690466

SUMMARY

A welding target is irradiated with a laser beam so as to form a beam spot that moves relatively with respect to the welding target along a locus having a spiral shape rotating around a rotation center moving in a welding direction. The welding target is welded using the laser beam irradiated with. While the welding target is irradiated with the laser beam, the welding target is irradiated with the laser beam based on an interval coefficient which is a value indicating an overlapping degree of the locus having the spiral shape in the welding direction.

This method suppresses generation of bubbles and provides a preferable welding state of uniform beads.

DETAIL DESCRIPTION OF EMBODIMENT

Figure 1:
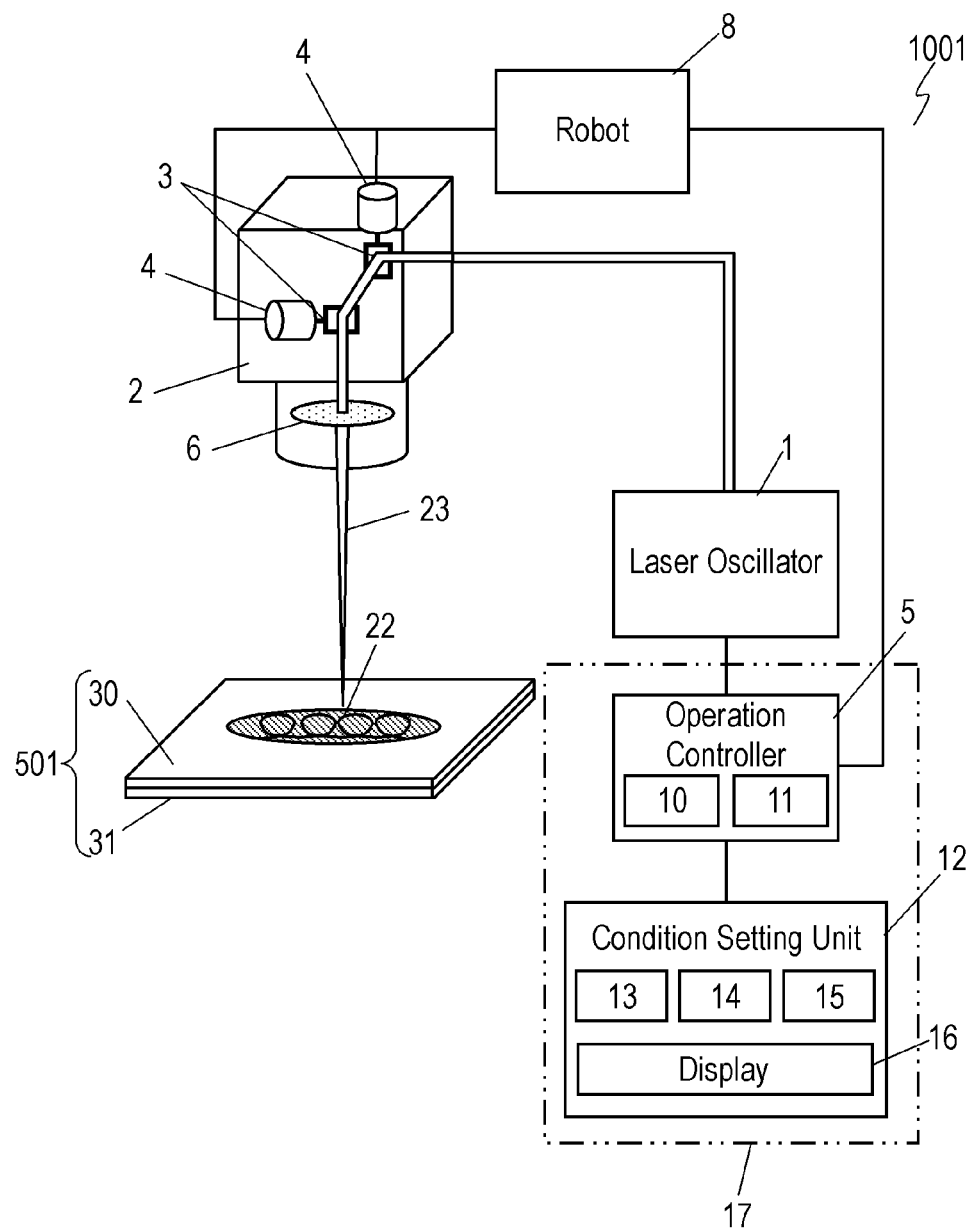
FIG. 1 is a schematic diagram of a laser welding system in accordance with an exemplary embodiment.

FIG. 1 is a schematic diagram of laser welding system 1001 in accordance with an exemplary embodiment. Laser welding system 1001 includes laser oscillator 1 which outputs laser beam 23, laser head 2 which is a galvanometer scanner head for applying laser beam 23 to welding target 501, and operation controller 5. Laser head 2 includes galvanometer mirror 3, galvanometer motor 4 and Fθ lens 6 to scan laser beam 23. Galvanometer mirror 3 changes a locus of laser beam 23. Galvanometer motor 4 causes galvanometer mirror 3 to rotate. An operation of galvanometer motor 4 is controlled by operation controller 5. Fe lens 6 causes laser beam 23 to form an image on welding target 501.

Laser welding system 1001 may further include robot 8 having laser head 2 attached thereto to move laser head 2. Robot 8 moves laser head 2 to a target position such that laser beam 23 is relatively scanned by laser head 2.

Laser welding system 1001 illustrated in FIG. 1 irradiates laser beam 23 to a predetermined position. Welding target 501 includes metallic plates 30 and 31 overlapping each other. Laser welding system 1001 irradiates metallic plate 30 with laser beam 23 so as to weld metallic plate 30 with metallic plate 31.

Figure 2:
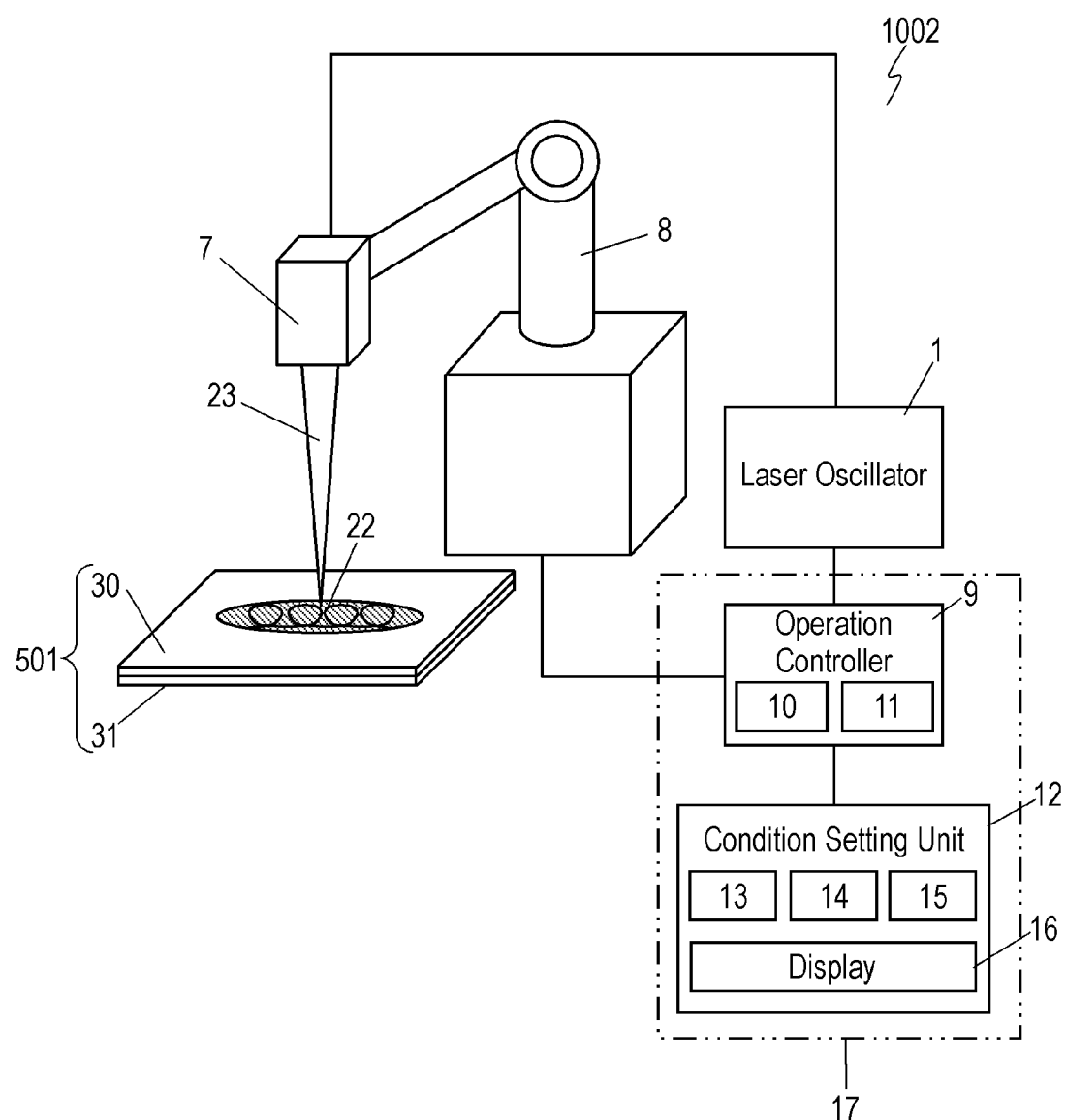
FIG. 2 is a schematic diagram of another laser welding system in accordance with the embodiment.

FIG. 2 is a schematic diagram of laser welding system 1002 in accordance with the embodiment. In FIG. 2, components identical to those of laser welding system 1001 illustrated in FIG. 1 are denoted by the same reference numerals. Laser welding system 1002 includes laser oscillator 1, laser head 7 which is a welding head for applying laser beam 23 output from laser oscillator 1 to welding target 501, robot 8, and operation controller 9. Laser head 7 causes laser beam 23 to form an image on welding target 501. Laser head 7 is attached to a tip of robot 8. Laser head 7 is moved to a target position, and laser head 7 itself is moved so as to scan laser beam 23. Operation controller 9 controls operations of robot 8 and laser head 7.

Laser welding system 1002 illustrated in FIG. 2 irradiates laser beam 23 to a predetermined position. Laser welding system 1002 irradiates metallic plate 30 with laser beam 23 so as to weld metallic plate 30 with metallic plate 31.

Laser welding system 1001 (1002) includes laser head 2 (7) which apply laser beam 23 output from laser oscillator 1 to welding target 501, robot 8 to which laser head 2 (7) and which moves laser head 2 (7), and controller 17 which controls operations of laser head 2 (7) and robot 8 for laser welding. Laser welding system 1001 (1002) irradiates welding target 501 spirally with laser beam 23. Controller 17 includes welding-target-information input unit 13 and laser-beam-information input unit 14. Welding target information that is information of welding target 501 is input to welding-target-information input unit 13. Laser beam information that is information of the laser beam is input to laser-beam-information input unit 14. The welding target information is of, for example, the shape or the thickness of a joint or the material of welding target 501. The laser beam information is of, for example, a beam diameter or an interval coefficient of laser beam 23. Controller 17 includes welding-condition determining unit 11 which determines a recommended value of welding conditions. That is, welding-condition determining unit 11 determines one or more of a welding speed, a bead width, and a penetration depth of a welded portion as a recommended value Ha based on the information input to the welding-target-information input unit 13, and determines one or more of a rotational frequency and a laser output as recommended value Hb based on the information input to laser-beam-information input unit 14. Controller 17 further includes parameter-change input unit 15 which changes the recommended value determined by welding-condition determining unit 11, and display 16 which displays thereon the recommended value which are determined by welding-condition determining unit 11.

The laser beam information includes information of interval coefficient L indicating an overlapping degree of the spiral locus of the laser beam in the welding direction.

Controller 17 which controls the operations and the laser welding of laser welding systems 1001 and 1002 is not necessarily an integrated controller, but may be divided into functional blocks which are separate units, such as an operation controller including welding-condition determining unit 11 which controls the operations of laser head 2 (7) and robot 8, and determines the recommended values of the welding conditions, and condition setting unit 12 which inputs and displays the welding conditions or the like.

In addition, for simplification of input operation, controller 17 further includes storage unit 10 which previously stores interval coefficient L in an appropriate range and beam diameter ϕ determined by a device specification as fixed values. Information of the beam quality may be input to laser-beam-information input unit 14 as laser beam information, or may be stored in storage unit 10 as information determined based on the device specification. With such units, even an operator with little experience of laser welding can easily determine welding conditions, and can suppress cost for determining construction conditions (time, materials, labor costs, electricity bills, and the like) only by inputting the welding target information and the laser beam information.

Specific operation processes for determining the laser welding conditions of laser welding systems 1001 and 1002 will be described later.

As a configuration which is different from a welding head used for laser welding systems 1001 and 1002 as illustrated in FIG. 1 and FIG. 2, a configuration in which plural rotating prisms are arranged in the welding head allows a designated position to be scanned and irradiated with laser beam 23.

Regarding the laser welding method, a penetration state which changes depending on the laser output and welding speed V will be described below. The laser welding of welding target 501 described below can be performed by, for example, laser welding systems 1001 and 1002 illustrated in FIG. 1 and FIG. 2.

When welding target 501 is melted, a keyhole which is a hole contacts molten pool 22 is formed. The laser welding is performed while the keyhole is formed so as to confirm, based on the relationship of the welding pool and the irradiation position, the occurrence of defects, such as pits constituted by micro-pores opening to the appearance of the molten portion and porosities constituted by bubbles remaining in the molten portion. First, the occurrence of the above defects in the welding along a linear locus is confirmed and then the occurrence of the defects in the next welding is confirmed as well. A spin locus is a locus of the laser beam which moves in the welding direction while moving the spot along a circular path by the irradiating laser beam. In other words, the spin locus is a locus of the laser beam which relatively moves to the straight line in the welding direction while rotating.

The welding in the linear locus was observed under a first welding condition as a comparative example, and a second welding condition.

Figure 3:
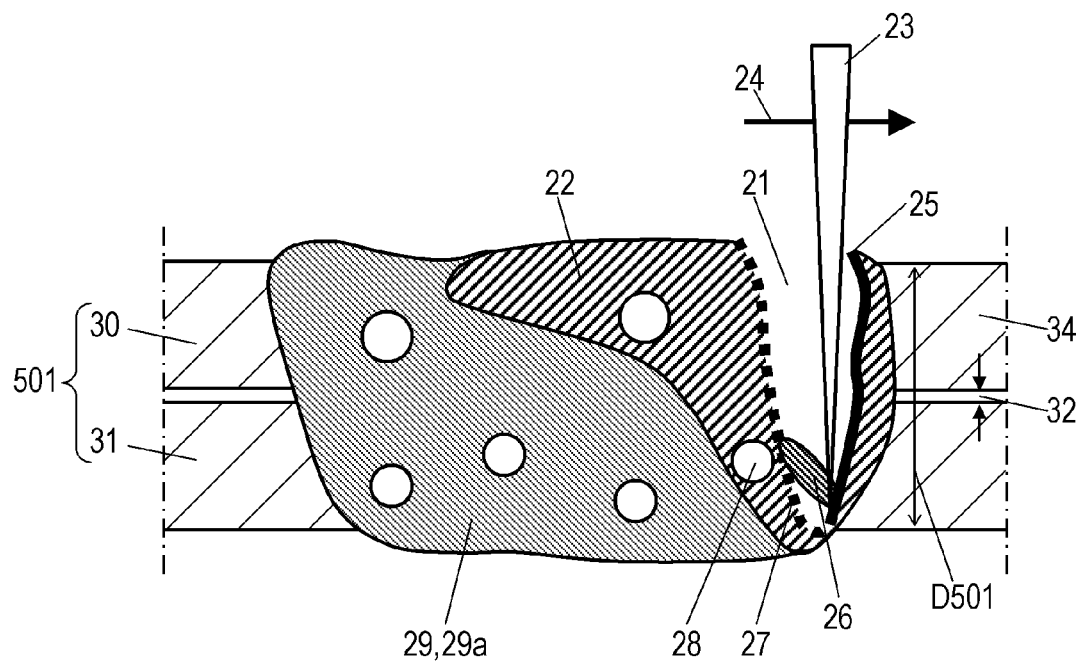
FIG. 3 is a sectional view of a welding target of the laser welding system in accordance with the embodiment.

The first welding condition is keyhole type welding in which the inside of the molten pool is irradiated with laser beam 23. FIG. 3 is a sectional view of a welded portion of welding target 501 in welding direction 24 under the first welding condition. In the welding, a portion of molten pool 22 is moved by irradiating the inside of molten pool 22 with laser beam 23. Accordingly, such welding corresponds to stirring of the molten pool disclosed in PTL 1. In this welding, metal vapor 26 is generated from the molten portion of welding target 501 by laser beam 23. The reaction force of the generation of the metal vapor forms keyhole 21 which is a hole surrounded by molten metal in molten pool 22.

Laser beam 23 is reflected on keyhole 21 plural times to has an energy absorption rate of metal of welding target 501 increasing as laser beam 23 is confined within keyhole 21, thereby providing a sufficient amount of the metal penetration of welding target 501. However, since the inside of molten pool 22 which is a liquid phase is irradiated with laser beam 23, and laser beam 23 moves to welding direction 24 along the welding line of welding target 501, a large amount of metal vapor 26 is generated from keyhole front wall 25 which is a liquid phase indicated by a thick solid line of keyhole 21 in welding direction 24. This is because, when molten pool 22 is irradiated with laser beam 23, the absorption rate of laser beam 23 on keyhole front wall 25 in molten pool 22 is increased and keyhole front wall 25 locally has a high temperature. As a result, metal vapor 26 presses keyhole rear wall 27 of keyhole 21 in a direction opposite to welding direction 24 to collapse keyhole rear wall 27, and generates a number of bubbles 28 in the inside of molten pool 22. Bubbles 28 remain as porosities in resolidified layer 29a of bead 29 formed by solidifying molten pool 22.

Figure 4:
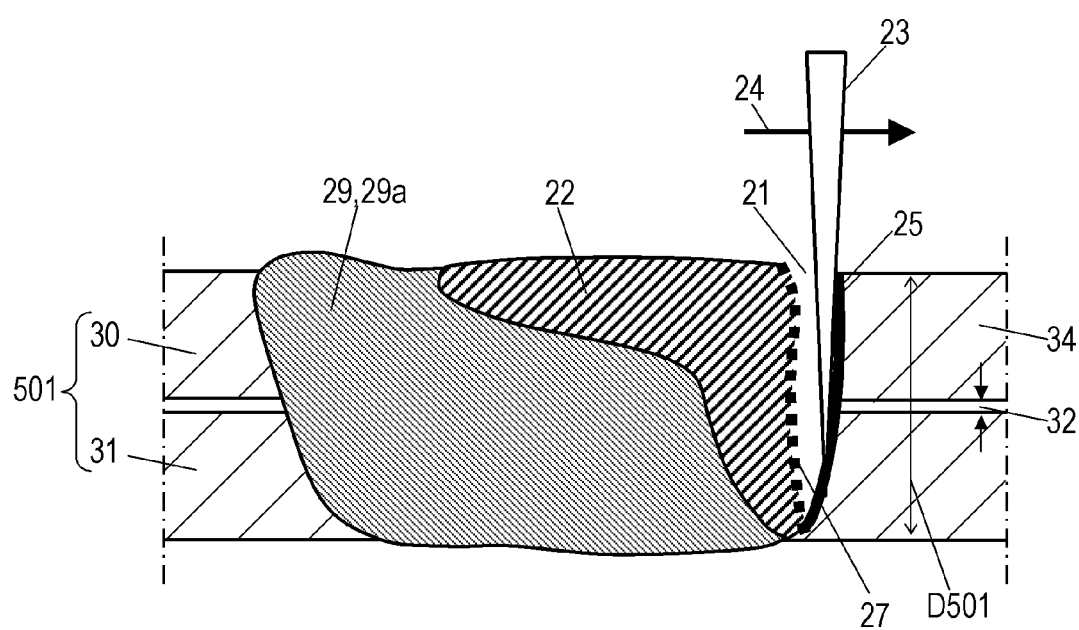
FIG. 4 is a sectional view of the welding target of the laser welding system in accordance with the embodiment.

The second welding condition is keyhole type welding in which unmolten portion 34 (solid phase), which is an outer edge of molten pool 22 and is in front of molten pool 22 in welding direction 24, is irradiated with laser beam 23. FIG. 4 is a sectional view of a welded portion of welding target 501 in welding direction 24 under the second welding condition. In the first welding condition, a molten layer (liquid phase) of molten pool 22 exists on the front side of laser beam 23 in welding direction 24, which is the direction in which the laser beam proceeds. In the second welding condition, no molten layer (liquid phase) of molten pool 22 exists on the front side of laser beam 23 in welding direction 24.

Unmolten portion 34 of welding target 501, which is an outer edge of molten pool 22 and is in front of molten pool 22 in welding direction 24, is irradiated with laser beam 23. This configuration suppresses the occurrence of metal vapor 26 from keyhole front wall 25 indicated by a thick solid line of keyhole 21, and suppresses the collapse of keyhole rear wall 27 of keyhole 21 indicated by a dotted line, thereby reducing the occurrence of bubbles 28.

In the first welding condition, the keyhole type welding is performed in which the inside of molten pool 22 is irradiated with laser beam 23 at welding speed V which is lower than 3 m/min while the laser output is adjusted.

In the second welding condition, the keyhole type welding is performed in which the front side of molten pool 22, which is the outer side of molten pool 22, is irradiated with laser beam 23 at welding speed V which is equal to or higher than 3 m/min while the laser output is adjusted.

From the relationship of the welding condition and the welding result, the second welding condition (refer to FIG. 4) is preferable as the welding condition providing a preferable welding state in the welding of the linear locus. In the second welding condition, laser beam 23 is applied not to the inside of the liquid phase of molten pool 22, but to the position toward unmolten portion 34 of the outer edge of molten pool 22 of welding direction 24. In the second welding condition, in order to perform the keyhole type welding in which keyhole 21 is formed in molten pool 22 is performed in a case where the welding target is metal, the laser welding is performed by irradiation of laser beam 23 at a power density of the laser of laser beam 23 ranging from 105 to 106 (W/cm$^2$). This configuration suppresses the occurrence of the porosities or pits in resolidified layer 29a of bead 29. In the laser welding in accordance with the embodiment, the relationship between a laser output and a position irradiated with a laser beam is used. In addition, the power density is determined based on a combination of the laser output and the beam diameter.

Figure 5:
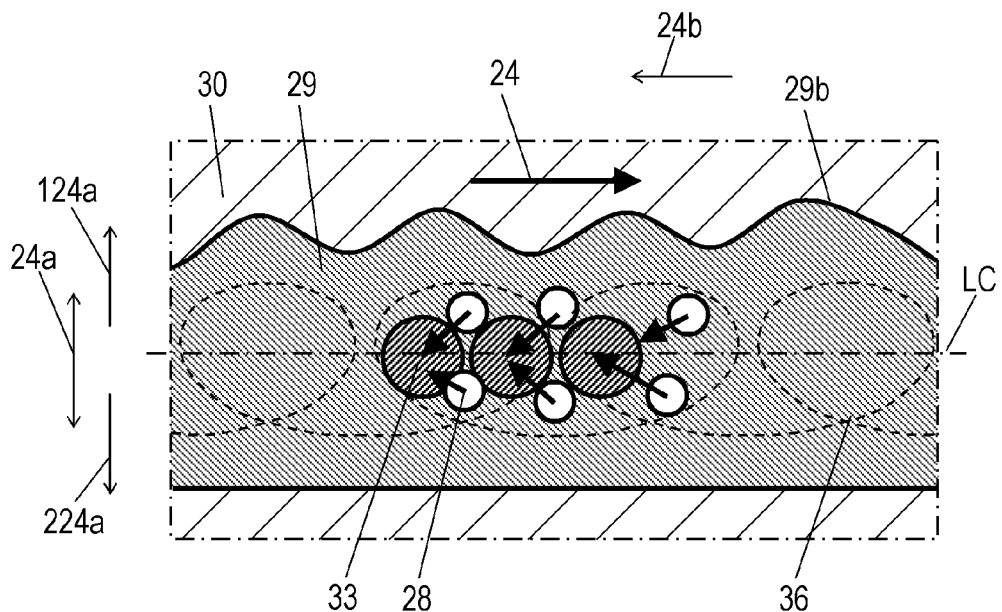
FIG. 5 is a top view of the welding target of the laser welding system in accordance with the embodiment.

The laser welding of the spin locus will be described below. FIG. 5 is a top view of welding target 501 in the laser welding of the spin locus. Even under the second welding condition, in a case of spirally emitting the laser beam by the spin locus welding, the inside of molten pool 22 (in the liquid phase) may be irradiated with laser beam 23. Accordingly, depending on the welding condition, pits 33 in which tiny holes appear in the appearance of the molten portion may occur in the vicinity of center line LC of the bead illustrated in FIG. 5.

Figure 6:
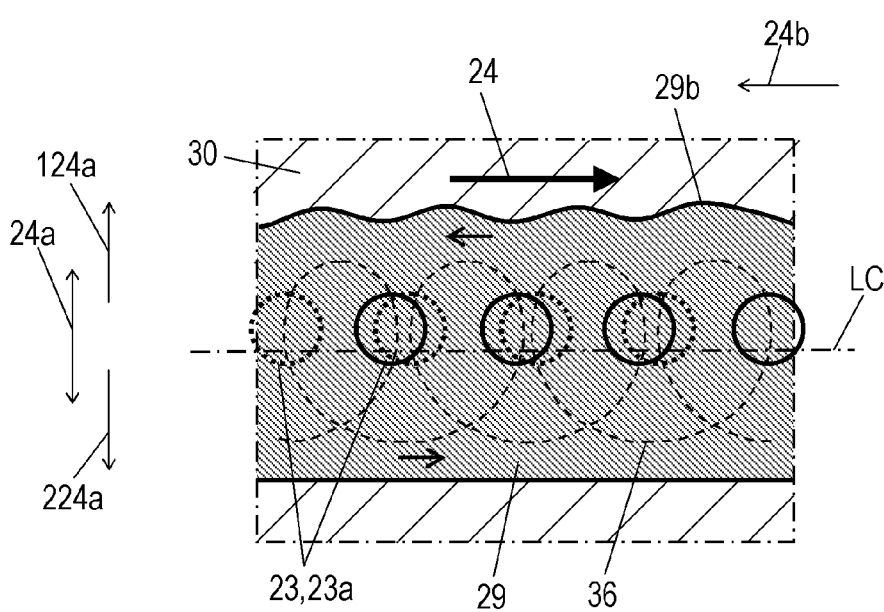
FIG. 6 is a top view of the welding target of the laser welding system in accordance with the embodiment.
Figure 7:
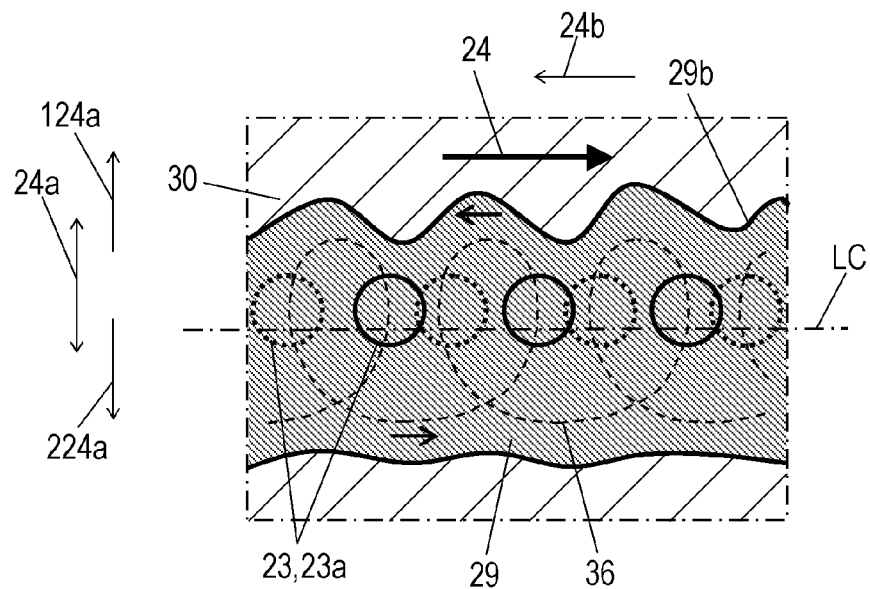
FIG. 7 is a top view of the welding target of the laser welding system in accordance with the embodiment.
Figure 8:
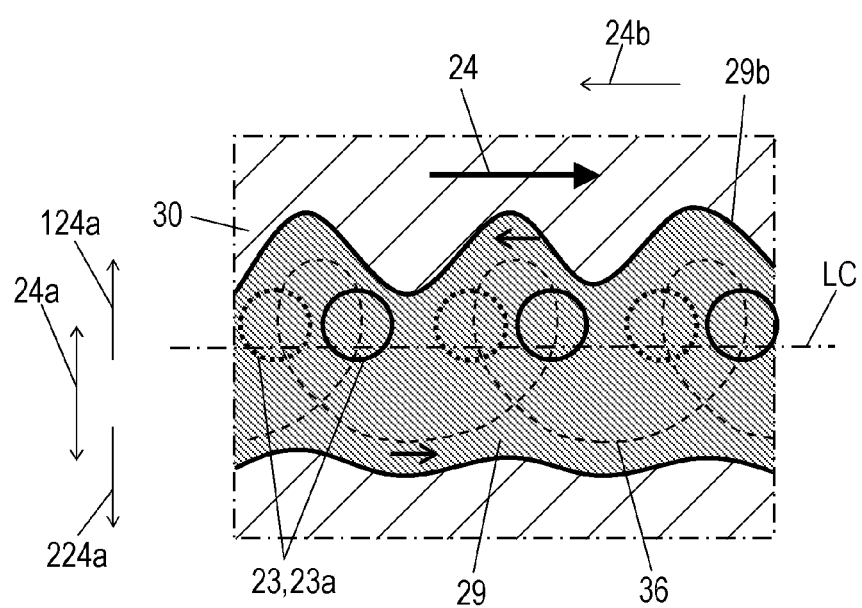
FIG. 8 is a top view of the welding target of the laser welding system in accordance with the embodiment.

FIGS. 6 to 8 are top views of welding target 501 in a case where the spin locus welding is performed under third to fifth welding conditions, respectively.

The moving speed in welding direction 24 is identical to one another under the third to fifth welding conditions illustrated in FIGS. 6 to 8. In other words, the moving velocities of the beam spot to form the spiral shape are different from one another under the conditions.

FIGS. 5 to 8 illustrate welding target 501 viewing from the side of emitting laser beam 23 regarding the shape of the spin locus (spiral locus) of laser beam 23 and the bead.

It was confirmed that the occurrence frequency of pits 33 changes depending on the difference in density of the spiral locus, that is, the difference in the density of the spiral interval which is the interval of the spiral locus. In a case where the spin interval is coarse, this is, the spin interval is wide, pits 33 are less likely to occur while, in a case where the spin interval is dense, that is, the spin interval is narrow, pits 33 are likely to occur. Accordingly, as the spin interval becomes denser, pits 33 are more likely to occur. In addition, as illustrated in FIG. 5, it was confirmed that pits 33 were likely to occur in the vicinity of center line LC which is the center in width direction 24a perpendicular to welding direction 24 of bead 29.

Under the third welding condition illustrated in FIG. 6, in the vicinity of center line LC of bead 29, beam spot 23a of laser beam 23 passes again to almost overlap the region through which beam spot 23a of laser beam 23 passes once.

Under the fourth welding condition illustrated in FIG. 7, beam spot 23a of laser beam 23 passes to contact the region through which beam spot 23a of laser beam 23 passes once.

Under the fifth welding condition illustrated in FIG. 8, beam spot 23a of laser beam 23 passes through a region separated from the region through which beam spot 23a of laser beam 23 passes once.

In a case where the welding is performed by spin locus 36 of laser beam 23 along which relatively moves laser beam 23 in welding direction 24 while spirally emitting laser beam 23, the welding is performed such that the spin interval which is the interval between the spiral shapes of spin locus 36 adjacent to each other in welding direction 24 becomes the spin intervals illustrated in FIGS. 6 to 8 under the third to fifth welding conditions, respectively, and then, welding results were observed.

Since beam spot 23a of laser beam 23 moves along spin locus 36, viewing in direction 124a along width direction 24a of bead 29, beam spot 23a passes firstly through center line LC in direction 124a along width direction 24a of bead 29 (indicated by a solid line), and then, passes secondly through center line LC in a direction 224a along width direction 24a of bead 29 opposite to direction 124a (indicated by a broken line). Beam spot 23a thus passes through center line LC of bead 29 twice.

FIG. 6 illustrates the shape of spin locus 36 of beam spot 23a of laser beam 23 and bead 29 viewing from the side of emitting laser beam 23 in a case where the welding is performed under the third welding condition. Under the third welding condition, beam spot 23a of laser beam 23 passes again, secondly though the region (indicated by the solid line) which almost (substantially) overlaps the region (indicated by the broken line) through which beam spot 23a of laser beam 23 firstly passes thorough center line LC of bead 29 extending in welding direction 24.

The case where beam spot 23a of laser beam 23 passes from the same direction as welding direction 24 on center line LC of bead 29 is indicated by the solid line and the case where beam spot 23a of laser beam 23 passes from the opposite direction to welding direction 24 is indicated by a dotted line. Since the spin interval between the spiral shapes of spin locus 36 is narrow (spiral locus is dense), the variation of bead width W is small, and bead end 29b of bead 29 in width direction 24a has a smooth shape.

However, on spin locus 36, beam spot 23a of laser beam 23 passes through center line LC of bead 29 in the bead width direction, and beam spot 23a of laser beam 23 passes through the inside of molten pool 22 (in the liquid phase) again and forms a wider molten pool 22. This configuration, similar to the first welding condition (refer to FIG. 3), laser beam 23 generates a large amount of metal vapor 26 from keyhole front wall 25 which is a liquid phase of keyhole 21 in the forward direction of spin locus 36. Metal vapor 26 generates bubbles 28, and as a result, pits 33 are likely to occur.

FIG. 7 illustrates the shape of spin locus 36 of beam spot 23a and bead 29 viewing from the side of emitting laser beam 23 in a case where the welding is performed under the fourth welding condition. Under the fourth welding condition, beam spot 23a of laser beam 23 passes again, secondly, through the region (indicated by the broken line) which slightly contacts the region (indicated by the solid line) through which beam spot 23a of laser beam 23 passes firstly on center line LC of bead 29 in the bead width direction.

The bead width W changes. Since the spin interval between the spiral shapes of spin locus 36 is wider than the third condition (refer to FIG. 6), bead end 29b of bead 29 in width direction 24a has a slightly wavy shape.

On spin locus 36, in center line LC of bead 29 in the bead width direction, in order to allow beam spot 23a of laser beam 23 to pass through and then pass again only the narrow molten pool 22 such that beam spot 23a of laser beam 23 passes through to contact the outer edge of the narrow molten pool 22, unmolten portion 34 of welding target 501 which is in front of the outer edge of molten pool 22 in a forward direction of spin locus 36 is irradiated with laser beam 23, similar to the second welding condition (see FIG. 4). This configuration suppresses the occurrence of metal vapor 26 from keyhole front wall 25 indicated by the thick solid line of keyhole 21, suppresses the collapse of keyhole rear wall 27 of keyhole 21, and suppresses the generation of bubbles 28, thereby reducing the occurrence of pits 33.

The generation of bubbles 28 due to metal vapor 26 is thus suppressed. Pits 33 in which tiny holes appear in the appearance of the molten portion are less likely to occur.

FIG. 8 illustrates the shape of spin locus 36 of bead 29 and bead 29 viewing from the side of emitting laser beam 23 in a case where the welding is performed under the fifth welding condition. Under the fifth welding condition, beam spot 23a of laser beam 23 passes again, secondly through the region (indicated by the broken line) which is located away from the region (indicated by the solid line) through which beam spot 23a of laser beam 23 passes firstly on center line LC of bead 29 in width direction 24a.

Under the fifth condition, since the spin interval between the spirals of spin locus 36 is wider (spiral locus is even coarse) than the fourth condition (refer to FIG. 7), bead width W greatly varies, and the shape of bead end 29b in width direction 24a is wavy.

Under the fifth condition, regarding the width of welding direction 24 in which the spiral shapes rotate in welding direction 24 on center line LC of bead 29, the spin interval between the spirals of spin locus 36 is wider than the third and fourth welding conditions (refer to FIG. 6 and FIG. 7). Conversely, in direction 24b opposite to welding direction 24, the width (spiral size) of welding direction 24 in which the spiral shapes rotate is wider than the third and fourth welding conditions (refer to FIG. 6 and FIG. 7). Since the speed of the spirally emitted laser beam 23, which is the speed of movement for forming the spiral shape, thus becomes relatively slow, an amount of heat input is concentrated. Therefore, beam spot 23a of laser beam 23 passes again through the liquid phase in molten pool 22 which is melted due to the passing beam spot 23a of laser beam 23, and therefore, the wide molten pool 22 is formed.

In a portion of molten pool 22 in the liquid phase state in which beam spot 23a of laser beam 23 passes again through the liquid phase in molten pool 22, a large amount of metal vapor 26 is thus generated from keyhole front wall 25 of keyhole 21 of welding target 501 in the forward direction of laser beam 23 of spin locus 36 similar to the case under the first welding condition (refer to FIG. 3). For this reason, under the fifth condition, when beam spot 23a crosses center line LC of bead 29 in width direction 24a, metal vapor 26 generates bubbles 28. As a result, pits 33 are likely to occur as compared with the fourth welding condition (refer to FIG. 7).

In addition, under the fifth condition, the occurrence of pits 33 is smaller than under the third welding condition (refer to FIG. 6), but pits 33 are concentrated in a portion with a small width in welding direction 24 in which the spiral shapes rotate in direction 24b, in other words, a portion in which the above-described wide molten pool 22 is formed.

FIGS. 9A to 11B illustrate the appearance (upper and lower surfaces) of bead 29 when the welding is actually performed under the third to fifth welding conditions (refer to FIG. 6 to FIG. 8).

Figure 9A:
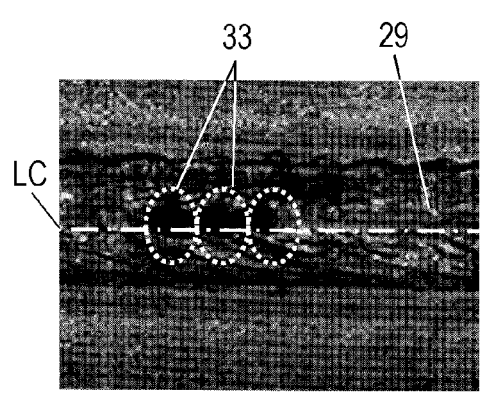
FIG. 9A illustrates an appearance of the welding target of the laser welding system in accordance with the embodiment.
Figure 9B:
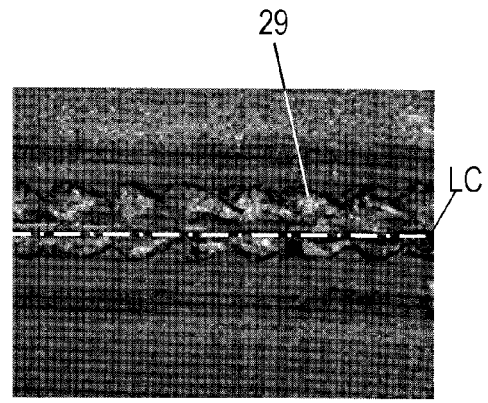
FIG. 9B illustrates an appearance of the welding target of the laser welding system in accordance with the embodiment.
Figure 10A:
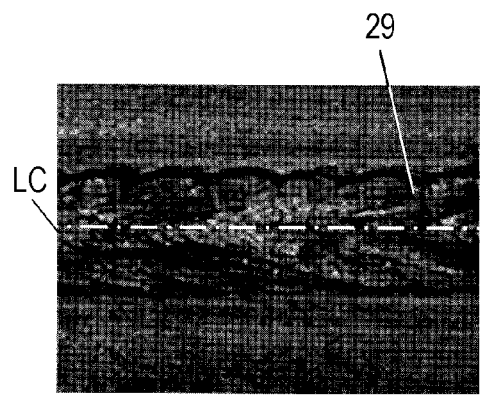
FIG. 10A illustrates an appearance of the laser welding system in accordance with the embodiment.
Figure 10B:
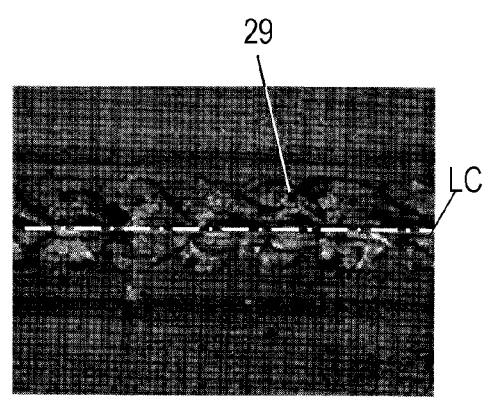
FIG. 10B illustrates an appearance of the welding target of the laser welding system in accordance with the embodiment.
Figure 11A:
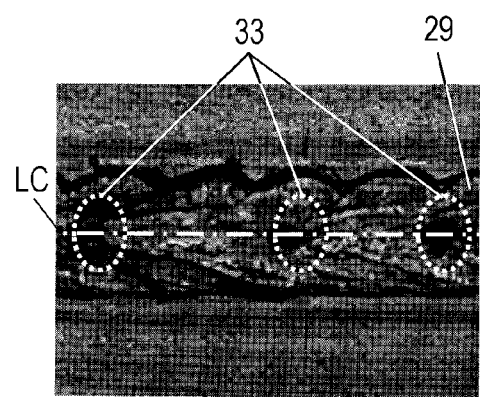
FIG. 11A illustrates an appearance of the welding target of the laser welding system in accordance with the embodiment.
Figure 11B:
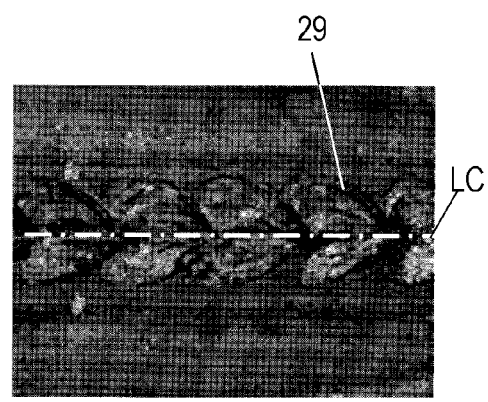
FIG. 11B illustrates an appearance of the welding target of the laser welding system in accordance with the embodiment.

FIGS. 9A, 10A, and 11A illustrate the upper surface of bead 29 under the third, fourth, and fifth welding conditions, respectively. FIGS. 9B, 10B, and 11B illustrate the lower surface of bead 29 under the third, fourth, and the fifth welding conditions, respectively. The upper surface illustrated in FIGS. 9A to 11A is a surface of welding target 501 which is irradiated with laser beam 23 and the lower surface is opposite to the upper surface.

Under the third to fifth welding conditions, welding speed V at which the beams spot moves in welding direction 24 is 1 m/min. Rotation radius r at which laser beam 23 rotates is 1.0 mm such that laser beam 23 with the laser output of 2.5 kW is spirally emitted while moving in welding direction 24 at welding speed V. The rotational frequency for forming the spiral shapes of laser beam 23 is adjusted so as to meet each of the third to fifth welding conditions. Since the welding speed V is the same under the third to fifth welding conditions, the amount of the heat output to welding target 501 from laser beam 23 is the same.

Rotation radius r is equal to the half of the width of spin locus 36 in width direction 24a on bead 29.

In FIG. 9A illustrating the appearance (surface) of bead 29 welded under the third welding condition (refer to FIG. 6), large pits 33 can be continuously confirmed on center line LC of bead 29.

In FIG. 10A illustrating the appearance (surface) of bead 29 welded under the fourth welding condition (refer to FIG. 7), pits 33 are not confirmed in the vicinity of center line LC of bead 29.

In FIG. 11A illustrating the appearance (surface) of bead 29 welded under the fifth welding condition (refer to FIG. 8), in the vicinity of center line LC across which beam spot 23a on spin locus 36 crosses, the small pits 33 are confirmed in a portion where the width in welding direction 24 in which the spiral rotates in direction 24b, that is, in the vicinity of the solidified point in the vicinity of center line LC which is solidified last.

A laser welding method in accordance with the embodiment will be described below.

The laser welding method according to the embodiment can be performed by, for example, each of the laser welding systems as illustrated in FIG. 1 and FIG. 2.

In the laser welding method according to the embodiment, welding target 501 including metallic plates 30 and 31 overlapping each other is irradiated with laser beam 23 along spin locus 36 in which beam spot 23a relatively moves in welding direction 24 while metallic plate 30 is spirally irradiated with laser beam 23, thereby welding target 501. As described in the fourth welding condition (refer to FIG. 7), welding target 501 is welded while avoiding the irradiation of laser beam 23 to the liquid phase portion which is molten pool 22 as much as possible but passing through the solid phase which is unmolten portion 34.

As illustrated in FIG. 6, under the third welding condition, in the vicinity of center line LC of bead 29 in welding direction 24, beam spot 23a of laser beam 23 passes again so as to almost overlap the region through which beam spot 23a of laser beam 23 passes once.

As illustrated in FIG. 7, under the fourth welding condition, beam spot 23a of laser beam 23 passes so as to contact the region through which beam spot 23a of laser beam 23 passes once.

As illustrated in FIG. 8, under the fifth welding condition, beam spot 23a of laser beam 23 passes through a region located away from the region through which beam spot 23a of laser beam 23 passes once.

As described above, in the laser welding in which the welding is performed by moving laser beam 23 in welding direction 24 while irradiating welding target 501 spirally with laser beam 23, since laser beam 23 passes again through the molten portion, the welding state changes based on the overlapping degree of the spiral locus of laser beam 23 moving in welding direction 24. The overlapping degree of the locus is indicated as interval coefficient L.

In a case where interval coefficient L for welding speed V and rotation radius r is smaller or larger than the predetermined range, pits 33 are likely to occur.

In a case where interval coefficient L for welding speed V and rotation radius r is larger than the predetermined range, the heat input changes and uniform bead 29 is not formed. As described above, under welding conditions where interval coefficient L is out of the predetermined designated range, sufficient joint strength cannot be obtained.

In order to obtain uniform bead 29 and suppress the occurrence of pits 33 and porosities (bubbles 28) accompanying spin locus 36 which relatively moves in welding direction 24 while spirally irradiating the welding target with laser beam 23, and spin locus 36 suitable for the welding material is set at intervals in a certain range. A method of calculating and determining appropriate rotational frequency F from certain welding speed V and bead width W will be described.

In the laser welding method in which the welding is performed by relatively moving laser beam 23 in welding direction 24 while spirally emitting laser beam 23, the spin interval (indicated as interval coefficient L) which is an interval between spiral shapes on spin locus 36 relates to the generation of pits 33.

In the above-described laser welding method, interval coefficient L indicating the overlapping degree of the spiral locus is previously determined, and then, the welding is performed based on interval coefficient L.

Figure 12:
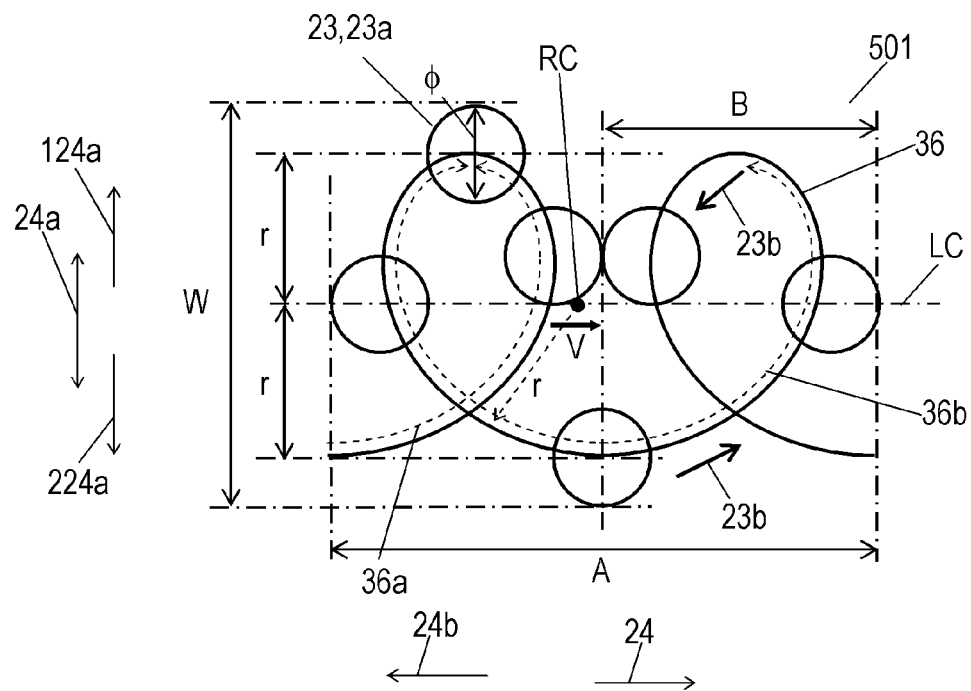
FIG. 12 schematically illustrates a bead width, a beam diameter, a rotation radius, and a welding speed V of the laser welding system in accordance with the embodiment.

FIG. 12 illustrates the spiral spin locus 36 of beam spot 23a of laser beam 23. The interval coefficient L which indicates the overlapping degree of the locus of the movement of beam spot 23a of laser beam 23 spirally emitted in welding direction 24 will be described below with reference to FIG. 12.

Beam spot 23a moves relatively with respect to welding target 501 along the locus (spin locus 36) having a spiral shape rotating around the rotation center RC which moves in welding direction 24. Beam spot 23a rotates around the rotation center RC at a rotation frequency F, that is, at a rotation period (1/F) apart from the rotation center RC by rotation radius r. In accordance with the embodiment, rotation radius r is a predetermined constant value.

Portion 36a of spin locus 36 which rotates around the rotation center RC at a certain period overlaps portion 36b of spin locus 36 which rotates around the rotation center RC at a subsequent period in welding direction 24. The interval coefficient L is a value indicating, on spin locus 36, the overlapping degree of the locus of the movement of laser beam 23 spirally emitted, that is, the overlapping degree of portions 36a and 36b of spin locus 36. The interval coefficient L is the ratio of width A in welding direction 24 within which beam spot 23a of laser beam 23 rotates around the rotation center RC at the moving velocity 23b having a component in welding direction 24 to width B in welding direction 24 within which beam spot 23a of laser beam 23 rotates around the rotation center RC at the moving velocity 23b having a component of direction 24b opposite to welding direction 24. In accordance with the embodiment, interval coefficient L is the ratio of width A to width B, and represented by the following formula with beam diameter φ of beam spot 23a, welding speed V at which beam spot 23a moves in welding direction 24, and rotational frequency F of the rotation component of the spiral locus.

$$L = A/B$$

$$A = W - \phi + V/(2 \times F)$$

$$B = W - \phi - V/(2 \times F)$$

Width A is obtained by adding the distance twice rotation radius r to the distance advanced by half cycle time (½ F) at welding speed V. Width B is obtained by subtracting the distance reverse by half cycle time (1/(2×F)) at welding speed V by the distance twice rotation radius r. Therefore, widths A and B are obtained by the following formula.

$$A = 2 \times r + V/(2 \times F)$$

$$B = 2 \times r - V/(2 \times F)$$

Rotation radius r is a rotation radius in width direction 24a of bead 29 as a rotation component of the spiral locus. In welding direction 24, since the linear component of the spiral locus is added, the relative speed of the beam spot 23a increases in the rotation in welding direction 24 in the spiral. When returning in the spiral direction 24b, the relative speed of the movement of beam spot 23a is decreased. Rotation radius r is calculated by the following formula with width W of bead 29 and beam diameter (I).

$$r = (W - \phi)/2$$

From the above-described relationship, the widths A and B are obtained by the following formulas.

$$A = W - \phi + V/(2 \times F)$$

$$B = W - \phi - V/(2 \times F)$$

Interval coefficient L which is obtained by the above formulas and is previously determined preferably ranges from 1.5 to 3, and more preferably ranges from 2 to 2.5 to obtain the spin locus under the fourth welding condition (refer to FIG. 7). This configuration produces bead 29 having the variation of width direction 24a of bead 29 and the generation of bubbles such as pits 33 suppressed. When performing the laser welding by using spin locus 36, after changing welding speed V and bead width W, as rotation radius r and the rotational frequency F are calculated by using interval coefficient L, and the values thereof are determined. Even when welding speed V and bead width W are changed, it is possible to perform the welding of spin locus 36 at a certain overlapping degree corresponding to the intended spiral interval coefficient L of laser beam 23, thereby easily adjusting the density of heat input at the welded portion.

As a main usage method, gap welding in a case where there is a gap in welding target 501 is performed by adjusting the space between spiral shapes of spin locus 36 of laser beam 23 so as to satisfy the range of the optimum values of interval coefficient L. More specifically, in a case where a gap 32 exists between metallic plate 30 (upper plate) and metallic plate 31 (lower plate), the welding condition in which tolerance to gap 32 is increased and welding defects, such as pits 33, are less likely to occur is selected by filling gap 32 with molten pool 22 (melt liquid).

According to experiments, when performing lap welding with a gap between the metal sheets of an upper plate and a lower plate in this manner, in the case of the welding of linear locus, when the gap interval exceeds ½ of the thickness of the upper plate, bonding defects that open holes in the upper plate are likely to occur. In the laser welding method according to the embodiment, based on interval coefficient L indicating the overlapping degree of the spiral locus of laser beam 23, the welding is performed by relatively moving laser beam 23 in welding direction 24 while spirally emitting laser beam 23. This configuration increases the amount of metal to be melted by melting the welded portion to be welded of welding target 501 in a wide range, and thereby, avoids bonding defective even in a case where the interval of the gap 32 exceeds ½ of the thickness of the upper plate. At this moment, since beam spot 23a of laser beam 23 spirally moves, asymmetric bead 29 in which the end portions of bead 29 in width direction 24a are asymmetrical with respect to center line LC is produced on welding target 501. Large unevenness on one side of both sides of bead 29 which are partitioned by center line LC and exist in directions 124a and 224a is formed (refer to FIG. 7). The asymmetry is reduced by increasing the spiral rotation frequency F with respect to welding speed V. But, since beam spot 23a passes through molten pool 22 more frequently, pits 33 are likely to occur (refer to FIG. 6).

In accordance with the embodiment, remote welding is assumed, and in order to secure a working distance and bead width W, beam diameter ϕ of beam spot 23a ranges from 0.3 to 1.0 mm. When rotation radius r is excessively small, the amount of molten metal is insufficient to fill gap 32. In contrast, when rotation radius r is excessively large, a wide range of metal is melted and thus the laser output becomes insufficient, hardly melting welding target 501 accordingly. Since rotation radius r can be calculated from the relationship between the thickness of the metallic plates and the width of gap 32, rotation radius r can be previously determined by, e.g. experiments.

In the case that the keyhole welding is performed to soft steel in a linear locus, the moving velocity 23b higher than or equal to 3 m/min easily suppresses poor welding, such as pits 33. Accordingly, even in the case of welding on spin locus 36, beam spot 32a is moved preferably at the moving velocity 23b higher than or equal to the above value. In the case of spin locus 36, beam spot 32a passes again through the location where welding target 501 is melted once, and thus it is preferable to move beam spot 23a with the spin interval according to the appropriate interval coefficient L. In a case where the spin interval is small, pits 33 are likely to occur since beam spot 23a passes through molten pool 22 several times. In a case where the spin interval is large, bead 29 becomes more ununiform (asymmetric with respect to center line LC). In addition, the frequency of occurrence of pits 33 changes depending on the kinds of metal. Pits 33 are likely to occur when welding target 501 is made of soft steel, and hardly occur when welding target 501 is made of stainless steel. Accordingly, spin interval is adjusted depending on the material of welding target 501.

Figure 13:
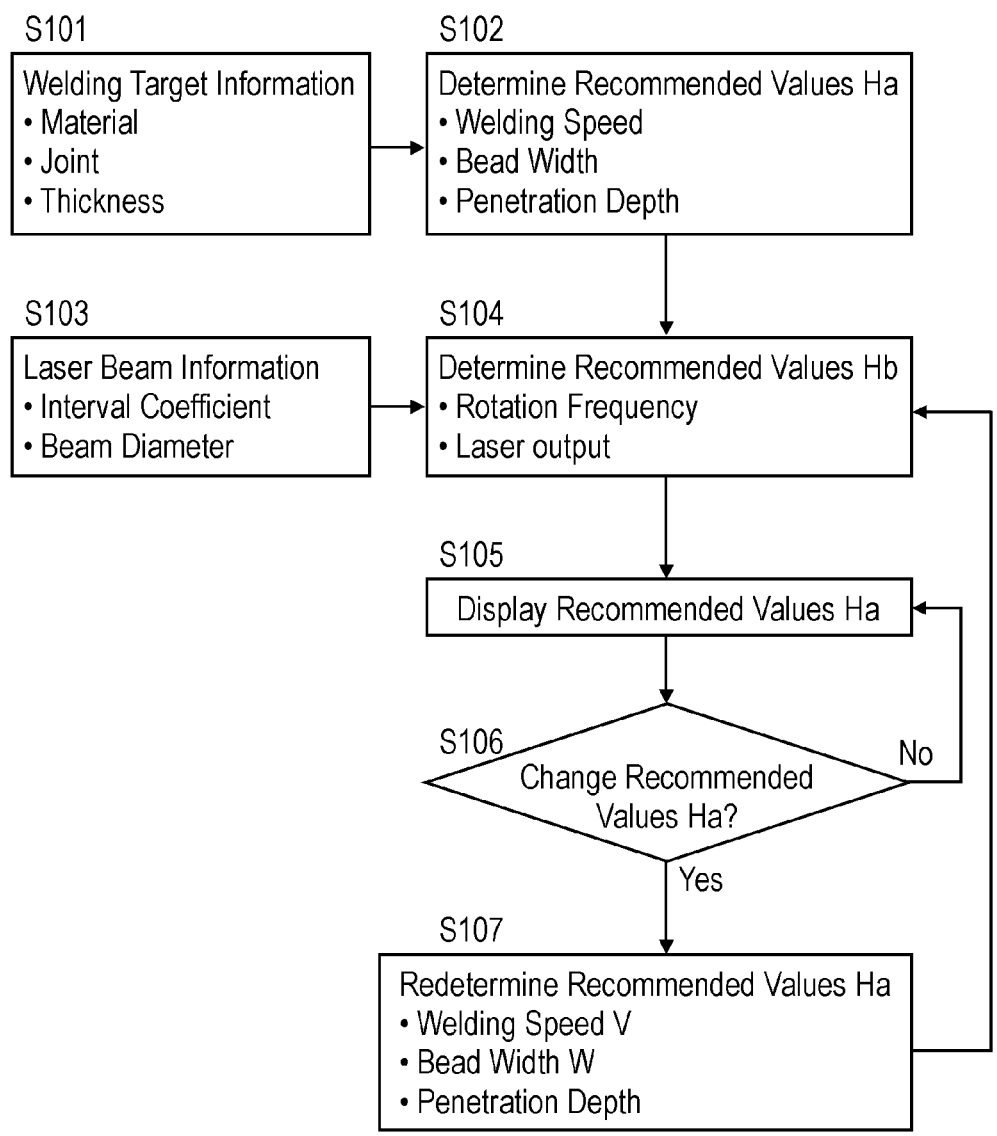
FIG. 13 is a flow chart illustrating an operation of determining a laser welding condition of the laser welding system in accordance with the embodiment.

FIG. 13 is a flow chart for determining the laser welding condition of the laser welding method in accordance with the embodiment.

First, welding target information which is information of welding target 501 is input (Step S101). The welding target information includes information of one or more of the material of welding target 501, a joint shape, and a thickness of welding target 501. Laser beam information which is information of laser beam 23 is input (Step S103). The laser beam information includes information of beam diameter ϕ and interval coefficient L. Recommended values Ha relating to takt time and joint strength are calculated and determined based on the welding target information (Step S102). Recommended values Ha are of one or more of welding speed V, bead width W, and the penetration depth of the welded portion. Recommended values Hb relating to laser behavior is calculated based on the laser beam information and recommended values Ha. Recommended values Hb are of one or more of rotational frequency F and the laser output.

Controller 17 displays recommended values Ha and recommended values Hb on display 16 (refer to FIG. 1 and FIG. 2) (Step S105). An operator selects whether or not recommended values Ha are changed in accordance with the requirements for welding target 501 (Step S106). In a case of changing recommended values Ha ("Yes" in Step S106), controller 17 recalculates and redetermines recommended values Ha (Step S107), and recommended values Hb are recalculated and redetermined in step S104 by using the laser beam information and recommended values Ha redetermined in Step S107, and the resultant is redisplayed in step S105.

Since the laser beam information is numerical values determined based on the system, the values input may be previously stored.

Welding speed V determined as recommended value Ha relates to the takt time of machining step. Bead width W is a parameter important to weld joint strength. Therefore, recommended values Ha can be changed in accordance with the embodiment.

For simplifying the input operation, interval coefficient L in a proper range and beam diameter ϕ determined by the device specification are previously stored as fixed values in storage unit 10, and may be read out at the time of being used in calculation.

As welding speed V determined in Steps S102 and S107, a recommended value in the range suitable for the laser oscillator to be used is displayed. The operator can recognize the laser output as recommended value Hb which is recalculated in Step S104 by modifying welding speed V and bead width W in Step S107 so as to obtain intended takt time and joint strength based on the above recommended values.

The laser output required for the laser welding of spin locus 36 (spiral locus) is calculated by multiplying a correction coefficient by the relationship between welding speed V and the laser output at the time of welding with a linear locus. The correction coefficient represents the effect of dispersion of heat by the laser beam moving along spin locus 36, and is larger than 1 (one).

In a case where bead width W is wide, that is, the rotation radius r is large, the higher laser output is required since thermal dispersion becomes larger than thermal dispersion in the case of the linear welding. Accordingly, the correction coefficient becomes larger.

In a case where the laser output determined as recommended value Hb in Step S104 exceeds the upper limit output of the laser oscillator, controller 17 does not necessarily display the laser output but does display an error message in Step S105

The rotational frequency F determined as recommended value Hb in Step S104 is calculated by the following formula with welding speed V determined as recommended value Ha in Step S102 or Step S107, interval coefficient L in Step S103, bead width W determined as recommended value Ha in Step S102 or Step S107, and beam diameter ϕ input in Step S103.

$$F = V \times \{(L+1)/(L-1)\}/\{2 \times (W-\phi)\}$$

Beam diameter ϕ is set in Step S103 based on a specification of the laser oscillator, welding speed V is determined as recommended value Ha in Step S102 or Step S107 based on, e.g. the required takt time, and bead width W is determined in accordance with the required joint strength. Therefore, if plural values of interval coefficient L corresponding to plural values of the spin interval indicating the density of the spiral locus on spin locus 36 are previously determined, the rotational frequency F of recommended value Hb can be calculated in Step S104.

In the laser welding conditions determining method as described above, it is possible to determine the conditions for each plate thickness and material without performing experiments for determining the conditions, and it is possible to reduce experiment time and material cost.

In the laser welding method according to the embodiment, the spin locus is determined such that beam spot 23a passes through the solid phase portion which is a portion not molten by preventing beam spot 23a from passing through the liquid phase portion which is a portion molten by irradiation of laser beam 23 as much as possible. Based on the overlapping degree of the spiral locus of laser beam 23 corresponding to the above spin locus, in other words, interval coefficient L indicating the density of the spiral locus of laser beam 23, welding target 501 is welded with laser beam 23 relatively moving in welding direction 24 while spirally emitting laser beam 23.

Specifically, welding target 501 is welded by irradiating unmolten portion 34 of welding target 501 with laser beam 23 as much as possible, such that beam spot 23a passes through the solid phase which is unmolten portion 34 by avoiding the irradiation of laser beam 23 to the liquid phase portion which is molten pool 22, for example, beam spot 23a of laser beam 23 passes through again the region (indicated by the broken line) which slightly contacts the region (indicated by the solid line) through which beam spot 23a of laser beam 23 passes firstly on the vicinity of center line LC of bead 29 under the fourth welding condition (refer to FIG. 7). Accordingly, for example, in the lap welding, even in a case where gap 32 exists between metallic plates 30 and 31 of welding target 501, it is possible to increase a margin for gap 32 and suppress the generation of bubbles, pits, and the like, thereby providing a preferable welding state.

Interval coefficient L of the spin locus for irradiating unmolten portion 34 of welding target 501 with laser beam 23 is preferably determined previously by, for example, experiments, the above formulas, and data tables so as to be preferable value and to be within a preferable range.

Conventional laser welding in which the welding is performed by spirally irradiating the welding target with the above-described laser beam promotes gas discharge by a stirring effect of the molten pool due to the spiral irradiation of the laser beam.

However, when the molten pool, a liquid phase portion, is irradiated with a laser beam, bubbles are likely generated from the keyhole, which is a hole contacting the molten pool, and is formed at the time of melting, thus increasing the porosities called as pits opening to the appearance of the molten portion due to bubbles remaining in fine holes or molten portions.

Skilled operators may set welding conditions for obtaining desired welding results in a relatively short time by taking advantage of their experiences of welding phenomenon determined by plural parameters. However, many operators may have little experience of laser welding construction. Operators with little experience spend a lot of time on setting proper laser welding conditions for a robot, an XY table, a laser welding head, and the like.

Furthermore, in recent years, improvement of welding quality has been strongly demanded. Depending on a joint shape, required amount of penetration, and joint strength, welding conditions such as the welding speed and the laser output are different. For operators with little experience, it is difficult to know whether to adjust a manipulator such as a robot or an XY table, whether to adjust the laser head or whether to adjust the laser output. For this reason, in order to derive the proper welding conditions, it is necessary to repeat laser welding, which consumes long time.

As described above, in the laser welding method according to the embodiment, two or more metallic plates 30 and 31 stacked in a vertical direction are welded by laser beam 23 while suppressing bubbles 28 generated from keyhole rear wall 27 at the time of the laser welding. For this reason, in the laser welding method according to the embodiment, welding target 501 is welded by irradiating the welding target with laser beam 23 so that laser beam 23 passes through a solid phase portion of metallic plates 30 and 31. Further, the laser output at the time of welding is selected to be equal to or larger than a value sufficient for keyhole type welding. For example, welding speed V of moving in welding direction 24 is preferably equal to or higher than 1 m/min. Welding speed V is preferably selected to be equal to or higher than the speed at which beam spot 23a does not reach the large molten pool 22 as much as possible.

In the laser welding method according to the embodiment, it is possible to obtain a preferable welding state regardless of the thicknesses of metallic plates 30 and 31.

In accordance with the embodiment, the laser welding is performed to two metallic plates 30 and 31 overlapping each other. This laser welding method is also applicable to the laser welding performed to three or more metallic plates overlapping one another.

A spiral locus of spin locus 36 may have various shapes, such as a simple spiral shape, a circular shape, a polygonal shape, such as a square or a triangle, and a partially discontinuous arcuate shape as long as spin locus 36 is a continuous locus by scanning and irradiating the welding target with laser beam 23. Interval coefficient L indicates the degree of roughness (overlapping degree) of the spiral locus.

The rotation direction of the irradiation with respect to welding direction 24 of beam spot 23a of the beam 23 of spin locus 36 may be clockwise or counterclockwise.

In accordance with the embodiment, in order to obtain a preferable welding result, welding speed V of laser beam 23, interval coefficient L of laser beam 23, the laser output of laser beam 23 and the like are appropriately set. These parameters may be combined as appropriate by selecting all of or some of these parameters.

An example of applying to a lap joint as welding target 501 is described. The laser welding method, the laser welding conditions determining method, and the laser welding system can be applied to the welding of welding target 501 having a lap fillet joint, a butt joint, a T shape joint, an angular joint, an edge joint, and a flare joint.

The laser welding method in accordance with the embodiment suppresses the generation of the bubbles and provides uniform bead 29, thus providing a preferable welding state.

The laser welding conditions setting method and the laser welding device allow an operator to set information of welding target 501 and information of laser beam 23 so as to determine and display recommended values Ha of the welding conditions, such as the laser output, welding speed V, the welding pattern, the strength of the welded portion, and the penetration of the welded portion, which are suitable for the above setting. Furthermore, even in a case where the operator changes the displayed recommended values Ha, recommended values Hb of the welding condition which are suitable to the changed values can be redetermined and displayed.

The system allows welding speed V relating to the takt time and bead width W relating to the joint strength to be changed by an operator, being usable.

The system reduces the time and labor for trial and error until the welding conditions are determined, and can reduce burden on the operator regarding the setting of the welding conditions.

INDUSTRIAL APPLICABILITY

A laser welding method according to the present invention provides a preferable welding state while suppressing generation of bubbles, and is usefully used as a laser welding method of performing the laser welding by irradiating a welding target with a laser beam.

REFERENCE MARKS IN THE DRAWINGS

1 laser oscillator
10 storage unit
11 welding-condition determining unit
12 condition setting unit
13 welding-target-information input unit
14 laser-beam-information input unit
15 parameter-change input unit
16 display
17 controller
21 keyhole
22 molten pool
23 laser beam
23*a* beam spot
24 welding direction
25 keyhole front wall
26 metal vapor
27 keyhole rear wall
28 bubbles
29 bead
29*a* resolidified layer
29*b* bead end
30 metallic plate
31 metallic plate
32 gap
33 pit
34 unmolten portion
36 spin locus
501 welding target
A width
B width
$\phi$ beam diameter
W bead width
r rotation radius

The invention claimed is:

1. A laser welding method comprising:
   irradiating a welding target with a laser beam so as to form a beam spot that moves relatively with respect to the welding target along a locus having a spiral shape rotating around a rotation center moving in a welding direction; and
   welding the welding target using the laser beam, wherein the irradiating of the welding target with the laser beam comprises irradiating the welding target with the laser beam based on an interval coefficient which is a value indicating an overlapping degree of the locus having the spiral shape in the welding direction,
   and wherein the interval coefficient is a ratio of a first width in the welding direction within which the beam spot rotates around the rotation center at a moving velocity having a component in the welding direction to a second width in the welding direction within which the beam spot rotates around the rotation center at a moving velocity having a component in a direction opposite to the welding direction.

2. The laser welding method of claim 1, wherein the interval coefficient is set such that the beam spot of the laser beam passes so as to only contact an outer edge of a region through which the beam spot of the laser beam has passed once, the region being in a vicinity of center line of a bead formed in the welding target with the laser beam in the welding direction.

3. The laser welding method of claim 1, wherein the interval coefficient is the ratio of the first width to the second width, and ranges from 1.5 to 3.

4. The laser welding method of claim 3, wherein the interval coefficient ranges from 2 to 2.5.

5. A method of determining a laser welding condition, the method being used in a laser welding system of welding a welding target by irradiating the welding target with a laser beam so as to form a beam spot that moves relatively with respect to the welding target along a locus having a spiral shape rotating around the rotation center moving in a welding direction, the method comprising:
   determining, based on welding target information which is information of the welding target, one or more of a welding speed at which the rotation center moves in the welding direction, a bead width of a bead formed in the welding target with the laser beam, and a penetration depth of a welded portion of the welding target with the laser beam, wherein the welding target information includes information of at least one of a material of the welding target, a shape of a joint, and a thickness of the welding target;
   setting laser beam information which is information of the laser beam, wherein the laser beam information includes information of a beam diameter of the laser beam and an interval coefficient which is a value indicating an overlapping degree of the locus having the spiral shape; and
   determining a rotational frequency at which the beam spot rotates around the rotation center based on the welding speed, the interval coefficient, the bead width, and the information of the beam diameter, wherein the interval coefficient is a ratio of a first width in the welding direction within which the beam spot rotates around the rotation center at a moving velocity having a component in the welding direction to a second width in the welding direction within which the beam spot rotates around the rotation center at a moving velocity having a component in a direction opposite to the welding direction.

6. The method of claim 5, wherein the interval coefficient ranges from 1.5 to 3.

7. The method of claim 6, wherein the interval coefficient ranges from 2 to 2.5.

8. The method of claim 6, further comprising:
displaying the determined one or more of the welding speed, the bead width, and the penetration depth, and the determined one or more of the rotational frequency and the laser output on a display;
changing and redetermining at least one of the determined one or more of the welding speed, the bead width, and the penetration depth; and
redetermining one or more of the rotational frequency and the laser output based on the redetermined at least one of the determined one or more of the welding speed, the bead width, and the penetration depth.

9. A laser welding system comprising:
a laser head that irradiates a welding target with a laser beam; and
a controller that controls the laser head and the laser beam such that the welding target is irradiated with the laser beam so as to form a beam spot that moves relatively with respect to the welding target along a locus having a spiral shape rotating around a rotation center moving in the welding direction, wherein
the controller includes:
  a welding-target-information input unit to which welding target information which is information of the welding target is input, the welding target information including information of at least one of a material of the welding target, a shape of a joint, and a thickness of the welding target;
  a laser-beam-information input unit to which laser beam information which is information of the laser beam is input, the laser beam information including an interval coefficient which is a value indicating an overlapping degree of the locus having the spiral shape and information of a beam diameter of the laser beam; and
  a welding-condition determining unit configured to,
    based on the welding target information, determine one or more first recommended values of a welding speed at which the rotation center moves in the welding direction, a bead width of a bead formed in the welding target with the laser beam, and a penetration depth of a welded portion of the welding target with the laser beam, and
    based on the interval coefficient and the information of the beam diameter of the laser beam information, and first recommended values among the one or more first recommended values of the welding speed and the bead width, determine one or more second recommended values of a rotational frequency at which the beam spot rotates around the rotation center and a laser output of the laser beam,
wherein the interval coefficient is a ratio of a first width in the welding direction within which the beam spot rotates around the rotation center at a moving velocity having a component in the welding direction to a second width in the welding direction within which the beam spot rotates around the rotation center at a moving velocity having a component in a direction opposite to the welding direction.

10. The laser welding system of claim 9, wherein
the laser-beam-information input unit includes an interval coefficient input unit to which the interval coefficient is input, and
the welding-condition determining unit calculates a rotational frequency F with the welding speed V, the interval coefficient L, the bead width W, and a beam diameter $\varphi$ of the beam spot by the following formula:

$$F=V\times\{(L+1)/(L-1)\}/\{2\times(W-\varphi)\}.$$

11. The laser welding method of claim 1, wherein
the welding of the welding target using the laser beam comprises forming a molten pool by melting the welding target with the laser beam, and
the irradiating of the welding target with the laser beam comprises irradiating with the laser beam an unmolten portion of the welding target located at an outer edge of the molten pool in front of the molten pool in a direction in which the beam spot moves along the locus.

12. The laser welding method of claim 1, wherein
the welding of the welding target using the laser beam comprises forming a bead on the welding target using the laser beam, and
the interval coefficient L is represented with the beam diameter $\varphi$ of the beam spot, the welding speed V at which the beam spot moves in the welding direction, and the rotational frequency F of a rotation component of the locus by a following formula:

$$L=A/B;$$

$$A=W-\varphi+V/(2\times F); \text{ and}$$

$$B=W-\varphi-V/(2\times F).$$

13. The laser welding method of claim 12, wherein the rotational frequency F is determined with the welding speed V, the interval coefficient L, the bead width W, and the beam diameter y of the beam spot by a following formula:

$$F=V\times\{(L+1)/(L-1)\}/\{2\times(W-\varphi)\}.$$

14. The method of claim 5, wherein the rotational frequency F is determined with the welding speed V, the interval coefficient L, the bead width W, and the beam diameter $\varphi$ of the beam spot by a following formula:

$$F=V\times\{(L+1)/(L-1)\}/\{2\times(W-\varphi)\}.$$

* * * * *